United States Patent [19]

Hitt, Jr.

[11] 4,267,826

[45] May 19, 1981

[54] SOLAR COLLECTOR FOR HEATING AND COOLING

[75] Inventor: William H. Hitt, Jr., San Bernardino, Calif.

[73] Assignee: Dale C. Miller, Riverside, Calif.

[21] Appl. No.: 917,210

[22] Filed: Jun. 20, 1978

[51] Int. Cl.³ .............................................. F24J 3/02
[52] U.S. Cl. .................................. 126/440; 126/429; 126/443
[58] Field of Search ................ 126/429, 440, 443, 442

[56] References Cited

U.S. PATENT DOCUMENTS

| | | | |
|---|---|---|---|
| 1,989,999 | 2/1935 | Niederle | 126/440 |
| 3,853,114 | 12/1974 | Gaydos, Jr. | 126/443 |
| 3,934,573 | 1/1976 | Dandini | 126/440 |
| 4,010,732 | 3/1977 | Sawata et al. | 126/440 X |

Primary Examiner—William E. Wayner

[57] ABSTRACT

An improved solar collector for heating space air comprising a concentric arrangement of an inner cylindrical shell around which is coiled heat transfer tubing. Around the tubing is mounted a plurality of refractors arranged side-by-side in a plurality of directions so that as the sun moves across the sky during the day, successive groups of refractors bend the sunlight upon the coiled tubing. Air forced within the cylindrical shell is heated up by being in thermal contact with the solar heated tubing.

2 Claims, 4 Drawing Figures

SOLAR COLLECTOR FOR HEATING AND COOLING

BACKGROUND OF THE INVENTION

The present invention pertains to apparatus for collecting and utilizing solar energy for the purpose of both heating and cooling.

Prior solar collector units have been characterized by two principal shortcomings: (1) Those units that are stationary require large, flat panels oriented generally toward the south and mounted at an angle such that their surfaces face toward the sun's average position at mid-day; and (2) Those units that revolve to follow the sun's movement are expensive, complicated, and subject to failure. The flat panels of the stationary units must be quite large in area in order to capture enough solar energy in the mornings and afternoons, when the sun is off to the east or west, and as a matter of fact, relatively little solar energy is captured during the early morning or late afternoon hours. The large area of panels is frequently unsightly, and it is sometimes difficult or impossible to find a location where the properly-oriented panels can be mounted.

SUMMARY OF THE INVENTION

The primary object of the invention is to provide a solar collector that is stationary, yet at the same time, compact and highly efficient, and capable of capturing a maximum amount of solar energy at all times during the day. The area required for the present unit is only a fraction of the area required by stationary flat panels of comparable heat output. At the same time, the present unit has the capability of concentraging and intensifying all of the energy contained within the rays of the sun that fall on the unit, regardless of the sun's position to the east or west.

The foregoing object is achieved by utilizing a cylindrical collector made up of a plurality of elongated, rectilinear, plano-convex refractors, which bend the rays of the sun in toward the center of the unit, and concentrate the sun's energy to provide an intensified high temperature that can be used for space heating or cooling.

Another object of the invention is to provide a space heater utilizing the solar collector described above, while a further object is to provide a refrigeration cooling system utilizing the solar collector.

The foregoing and other objects and advantages of the invention will become apparent to those skilled in the art from the following detailed description of the preferred embodiments thereof, with reference to the accompanying drawings.

DESCRIPTION OF THE PREFERRED EMBODIMENTS

Figure 1:
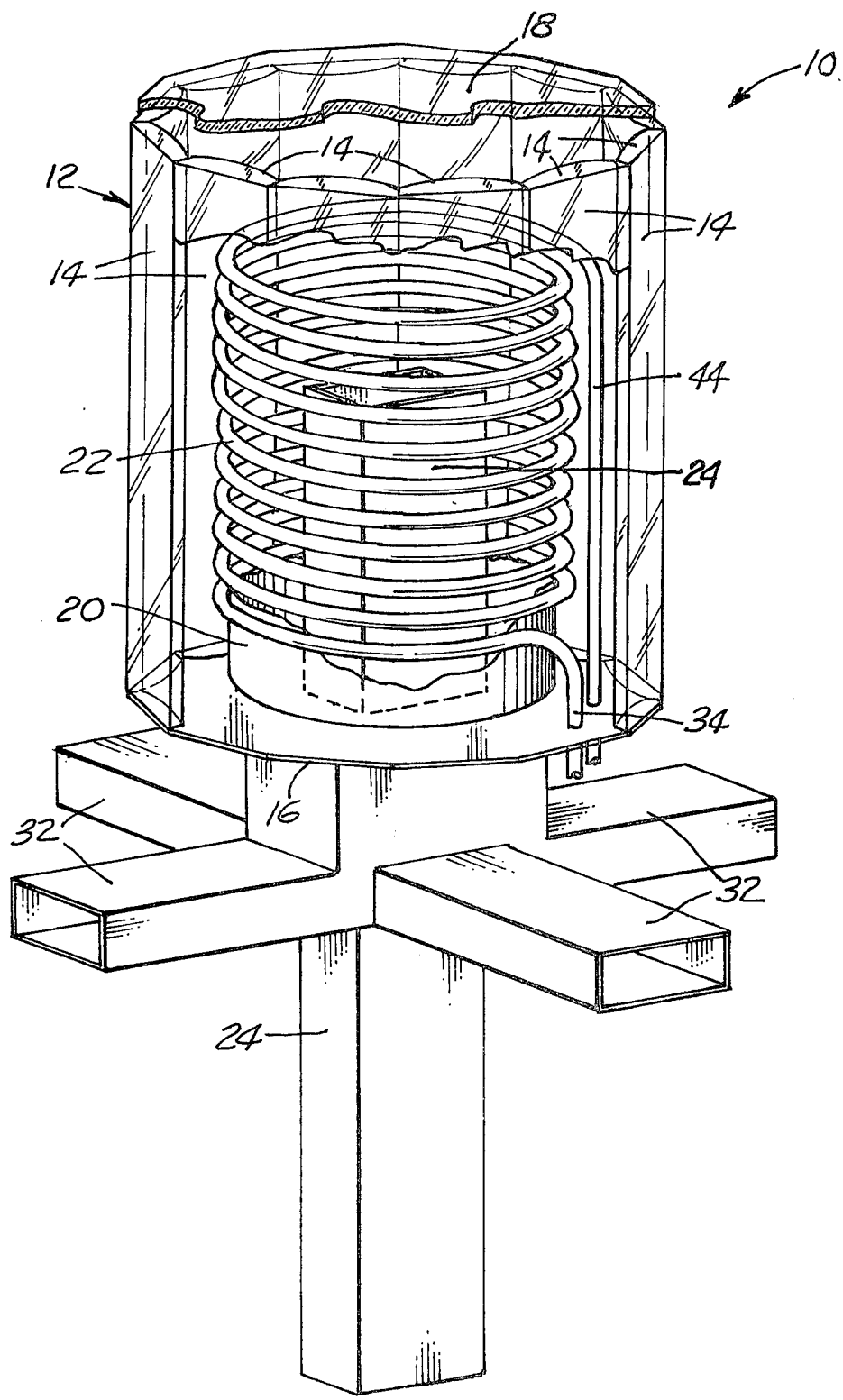
FIG. 1 is a partially cut-away perspective view of a solar collector and space-heating unit embodying the principles of the present invention.
Figure 2:
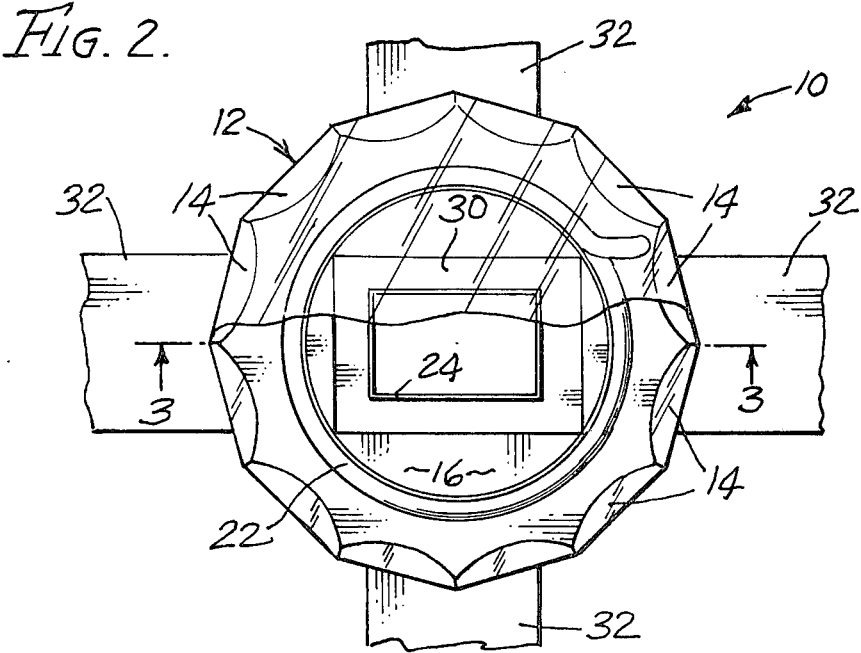
FIG. 2 is a plan view of the same.
Figure 3:
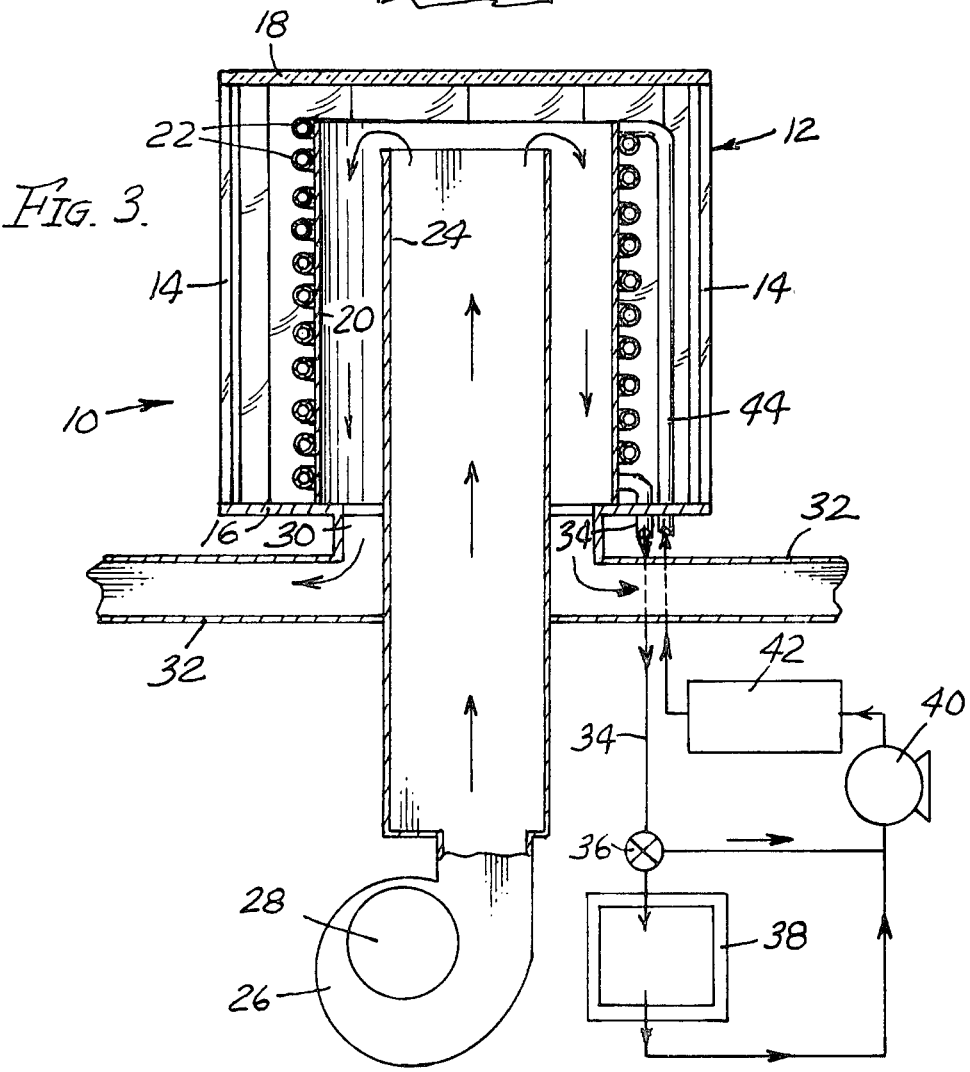
FIG. 3 is a sectional view taken at 3—3 in FIG. 2, and including a schematic showing of the auxiliary equipment.

In FIGS. 1, 2 and 3, the solar collector of the present invention is designated in its entirety by the reference numeral 10, and comprises a cylindrical housing 12 formed of a plurality of elongated, rectilinear, plano-convex refractors, or lenses 14 made of transparent material such as glass, methacrylate, or other transparent plastic. The refractors 14 are arranged side-edge to side-edge to form an elongated cylinder, the axis of which may be vertical or, alternatively, parallel to the earth's polar axis. The cylindrical housing is closed at the lower end by a bottom plate 16, and at the top end by a top lid 18. Disposed concentrically within the cylindrical housing 12 is a cylindrical shell 20 of smaller diameter than cylinder 12, the shell 20 being preferably formed of sheet metal and having copper or aluminum tubing 22 coiled around its outer surface and brazed or soldered thereto.

Located centrally within the shell 20 is a vertically extending sheet metal duct 24, which may be of rectangular cross-section, as shown, or any other cross-sectional configuration. The top end of the duct 24 opens into the interior of the cylindrical housing 12, and its bottom end is connected to a blower 26 driven by a motor 28. The bottom plate 16 of cylindrical housing 12 has an opening 30 formed therein, through which duct 24 passes. The opening 30 also opens into a system of ducts 32 leading to the several rooms of the building to be warmed.

Tubing 22, which is wound spirally around the cylindrical shell 20 from the top end thereof to the bottom, is connected at its bottom end to a pipe 34 leading down to a 3-way valve 36, insulated holding tank 38, motor-driven pump 40, and auxiliary heater 42. From heater 42, a pipe 44 extends back up to the top end of the coil 22.

The tubing 22, pipes 34, 44, tank 38 and heater 42 are filled with water to form a closed circulating system, in which the water is heated by the sun during daylight hours until the tank is full of relatively hot water, serving as a thermal reservoir.

The refractors 14 bend the rays of sunlight in toward the longitudinal axis of the cylindrical housing 12 and concentrate the sun's rays to a narrow, vertical band of high intensity radiant energy focused onto the tubing 22 coiled around the cylindrical shell 20. Since the refractors 14 face in all directions, one side of the cylindrical housing 12 will always be facing the sun, whether it is to the east in the morning, to the south at mid-day, or to the west in the afternoon. At any time the sun is shining, one whole side of the cylindrical housing 12 will be facing directly toward the sun, and the refractors 14 on that one side will concentrate and intensify the sun's rays on the coiled tubing 22, heating up the water that is circulating through the tubing. After a certain number of hours, depending upon the season, the latitude, and the amount of cloud cover in the sky, the insulated holding tank 38 will become filled with hot water that has been heated by the sun's rays, and enough heat can be stored to carry over far into the evening, or even for several days of overcast.

During the day, while the sun's rays are being focussed on the coiled tubing 22, air is circulated by the blower 26, and is blown up through the duct 24 to the top of housing 12, where the air turns over the top edge of the duct and travels downwardly through the space between the duct 24 and cylindrical shell 20. As the tubing 22 is in contact with shell 20, heat is conducted to the shell, and the heated shell 20 warms the air. The warmed air leaves the housing through opening 30 and enters the ducts 32, which carry the warmed air to the respective rooms to be heated.

If the sky becomes overcast so that relatively little insolation is captured by the unit, the stored hot water in tank 38 will continue to be circulated through the tubing 22 by pump 40, and this will continue to heat the shell 20 and to warm the air for as long as the temperature of the water remains high enough to supply the required amount of heat.

If the water should cool off before the sun comes out again, the heater 42 may be turned on by a thermostat (not shown) and the water will then be heated up by the combustion of fuel or by electrical heat.

Figure 4:
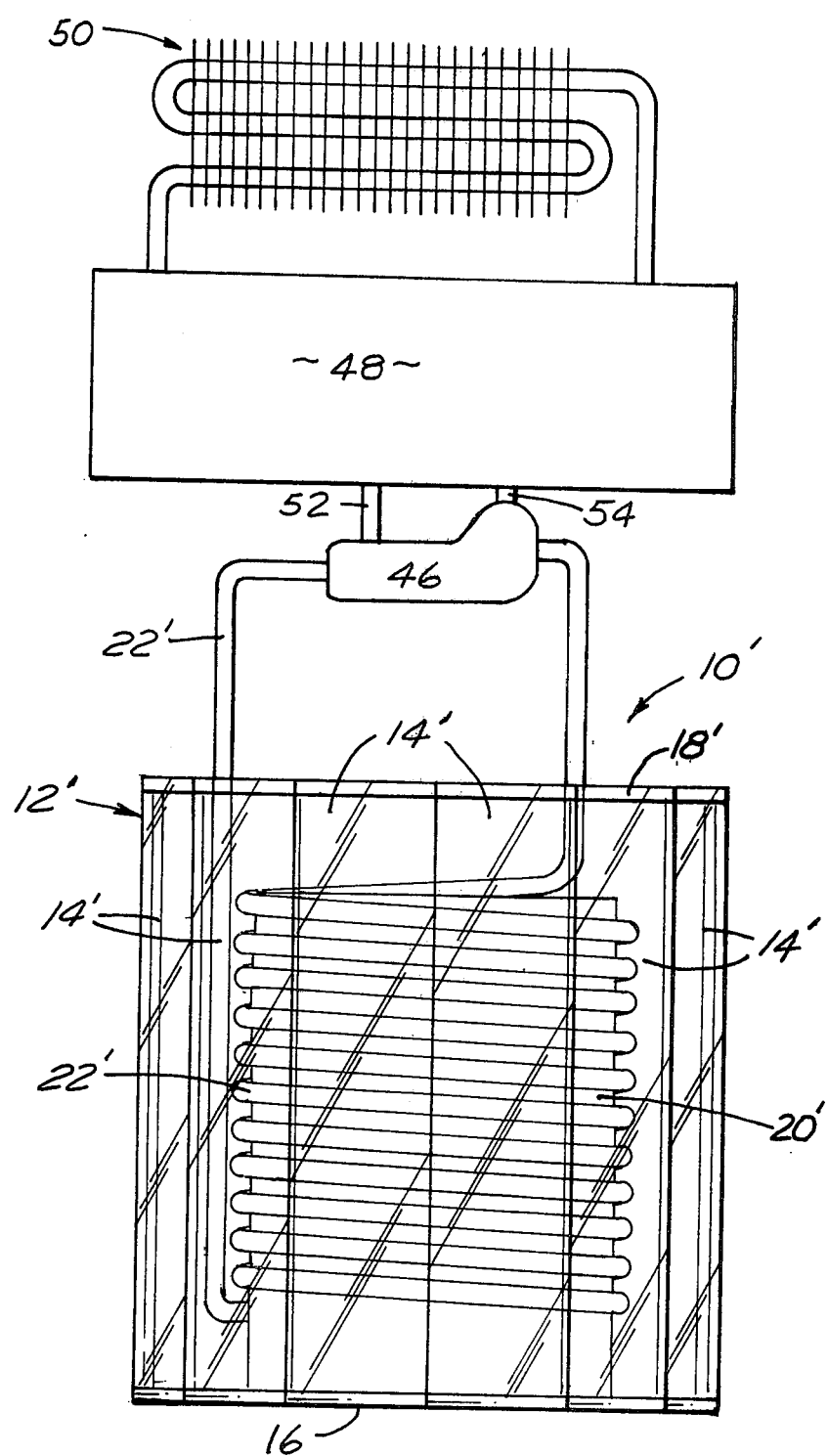
FIG. 4 is a side elevational view of a solar collector, with a schematic representation of an associated ammonia absorption refrigerator system that is energized by solar heat.

Another embodiment of the invention is illustrated in FIG. 4, to which attention is now directed. In this form of the invention, those parts that are identical to their counterparts in FIGS. 1-3 are given the same reference numeral with a prime (') suffix. The solar collector 10' is likewise made up of a plurality of elongated, rectilinear, plano-convex refractors or lenses 14', arranged side-edge to side-edge in the form of a vertical cylinder, with a cylindrical shell 20' centered on the axis thereof. Tubing 22' is coiled around shell 20', but instead of being connected to a holding tank, pump, and heater, as in FIGS. 1-3, the tubing 22' is connected to opposite ends of a generator 46 which is connected to, and forms an integral part of a Servel-Electrolux ammoniz absorption refrigerator system. The remaining components of the refrigeration system are indicated schematically by the box 48, which supplies refrigerant to an evaporator 50. The Servel-Electrolux system uses a strong ammonia liquor which fills the tubing 22' and is heated by solar heat that is concentrated on the tubing by the refractors 14'. The highly heated ammonia liquor is discharged from the tubing 22' into the generator 46, where a mixture of ammonia vapor with some water vapor is driven off through a pipe 52 at the left-hand of the generator to the usual analyzer, rectifier, condenser and evaporator 50. The analyzer, rectifier and condenser are not shown, as they are conventional and well-known in the art.

At the other end of generator 46, a fraction of the strong liquor is discharged up through a second pipe 54 as a stream of intermixed weak liquor slugs and ammonia vapor bubbles into the unit 48, where it passes through the usual liquid-vapor separator, rectifier, condenser and the evaporator 50. The ammonia liquor may be circulated by convection, or by means of a pump (not shown). In this second embodiment of the invention, there is no system of ducts and blowers, as in FIGS. 1-3, and the cylindrical shell 20' is empty.

Usually, a gas flame is burned in the generator 46 to cause the ammonia vapor and water vapor to be driven off through the pipes 52 and 54, but in the present invention, solar heat is used to do the job, and this solar heat is supplied constantly as long as the sun shines.

While I have shown and described in considerable detail what I believe to be the preferred forms of my invention, it will be understood by those skilled in the art that the invention is not limited by such details, but may take various other forms within the scope of the claims. For example, it is contemplated that a combination heating and cooling unit might be made up using space-heating ducts, as in FIGS. 1-3, with associated accessory equipment such as valve 36, tanke 38, pump 40, and heater 42, in combination with the refrigerant system shown in FIG. 4, in which case there would be two separate coils of tubing 22,22' wrapped around the cylinder 20, 20', one of which is filled with water and the other with strong ammonia liquor. In this type of arrangement only one of the two systems would be used at a time, while the other system is inactivated.

The principal feature of the invention is the combination of a plurality of lenses, or refractors, arranged to face in all directions around the compass, so that regardless of the sun's position in the sky, the full amount of the sun's heat will be concentrated on the surface to be heated, and will be intensified to produce maximum heating effect for either space heating or refrigeration.

What I claim is:

1. A solar collector comprising, in combination:

a plurality of refractors arranged side-by-side and facing in a plurality of directions toward that portion of the sky in which the sun appears to travel from sunrise to sunset, said refractors being disposed so that as the sun moves across the sky, successive groups of the refractors bend the rays of sunlight so that they are concentrated on a common target;

said common target comprising tubing carrying fluid that is to be heated by the sun's rays that are concentrated and intensified by said refractors;

said common target additionally including a cylindrical shell around which said tubing is coiled in heat-transfer contact therewith, so that the shell is heated by the hot fluid in the tubing; and means for circulating air through said shell whereby the air is warmed by contact with the heated shell and is then directed to space to be warmed.

2. A solar collector as in claim 1, wherein said cylindrical assembly is closed at the sides and ends to form an enclosed cylindrical chamber; and said means for circulating air through said shell includes a first duct extending upwardly from the bottom of the cylinder along the axis of the cylinder, said first duct cooperating with said cylindrical shell to form an annular passageway extending for substantially the full length of the cylindrical chamber, the top end of said first duct opening into said cylindrical chamber near the top end thereof, a second duct opening into said annular passageway at the bottom end thereof, and a blower for circulating air upwardly through said first duct, then downwardly through said annular passageway, and out through said second duct.

* * * * *